United States Patent Office 3,552,877
Patented Jan. 5, 1971

3,552,877
OUTLET HOUSING FOR AN AXIAL-FLOW TURBOMACHINE
Alfred Christ, Viktor Schreiber, and Erhard Tomica, Zurich, Switzerland, assignors to Escher Wyss Limited, Zurich, Switzerland, a corporation of Switzerland
Filed Feb. 14, 1969, Ser. No. 799,251
Claims priority, application Switzerland, Feb. 15, 1968, 2,258/68
Int. Cl. F01d 1/02, 1/04
U.S. Cl. 415—209
10 Claims

ABSTRACT OF THE DISCLOSURE

An outlet housing for an axial-flow turbomachine, having an axial diffusor with annular channel, a deflector terminating in radial direction and a radial diffusor. The flow cross-section within the deflector decreases by from 5% to 15% in direction of flow. The aperture angle of the axial diffusor is at least 12° and 55° at the most. When the axial diffusor has a great aperture angle and is correspondingly short, guide walls are provided with the deflector and the radial diffusor.

BACKGROUND OF THE INVENTION

In thermal axial-flow turbomachines, such as steam or gas turbines and compressors, the axial diffusor adjoining the last blade ring is of annular construction, in contrast, for instance, to water turbines. In the development of high-power turbomachines, there is a tendency to make the rate of axial flow as high as possible, and therefore the outlet velocities from the end stages become increasingly higher. To keep to outlet loss as low as possible, the kinetic energy of the emergent flow must be converted into pressure energy as far as possible.

Long annular diffusors are known, in which the channel axes extend axially or also continuously radially curved or diagonally. These constructions have in common the drawback of a large axial overall length, amounting to a multiple of the height of the end blades. The overall length of the entire plant is additionally increased by the fact that there is no available space for the accommodation of the shaft bearing of the rotor in the vicinity of the end stage and the bearing has, therefore, to be arranged farther away, or, however, a complicated inner bearing must be used.

SUMMARY OF THE INVENTION

It is the object of the present invention to provide an outlet housing for an axial-flow turbomachine, which has a diffusor effect at least equal to the known constructions, and at the same time a considerably shorter overall axial length. To this purpose an outlet housing with an axial diffusor and a deflector is constructed according to the invention such that, within the deflector, the flow cross-section decreases in direction of flow, and a radial diffusor, adjoining the deflector, is provided.

BRIEF DESCRIPTION OF THE DRAWING

Two embodiment examples of an outlet housing of an axial-flow turbomachine according to the invention are represented in simplified form in the drawing, in which.

DESCRIPTION OF THE PREFERRED EMBODIMENTS

Figures 1, 2:
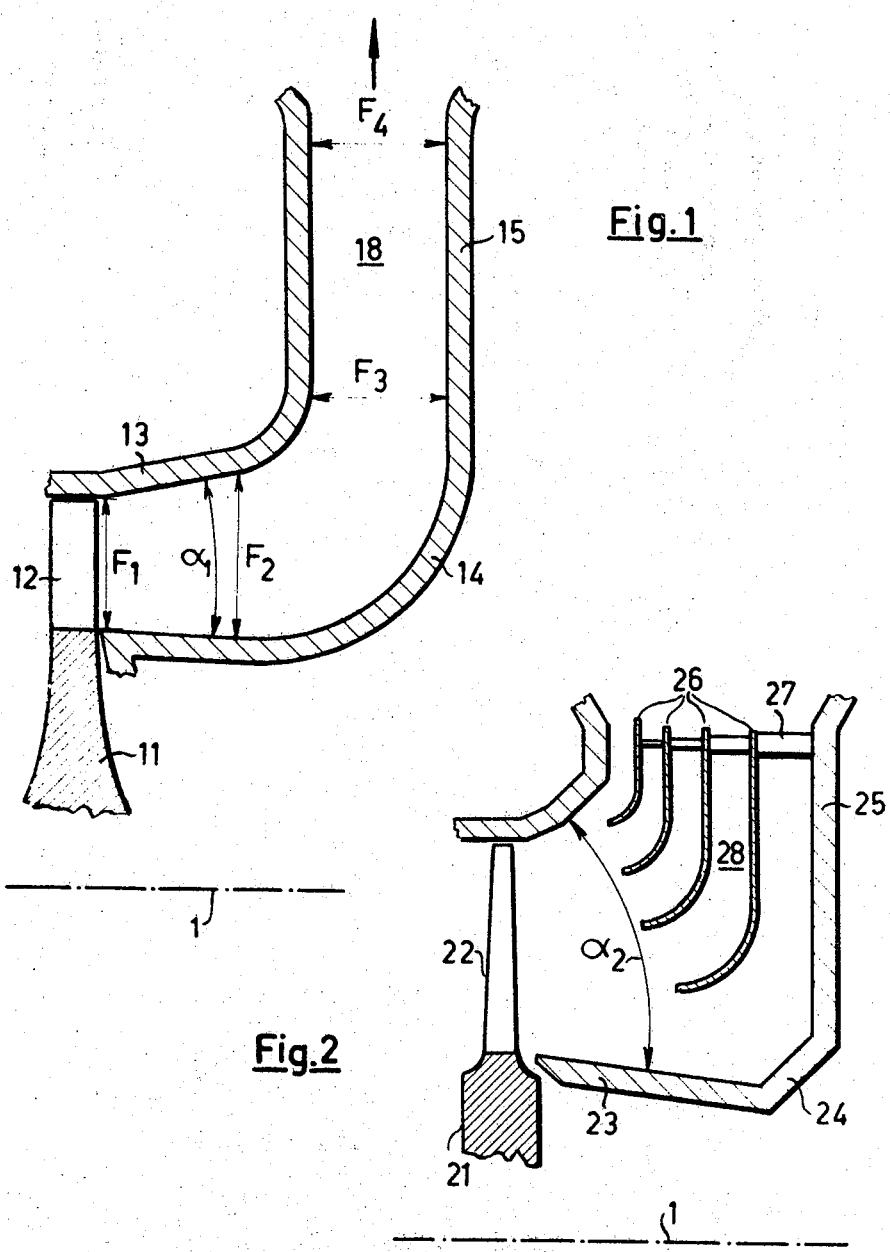
FIG. 1 shows an axial section through a part of an outlet housing of an axial compressor.
FIG. 2 shows an axial section through a part of an outlet housing of a low-pressure steam turbine.

In FIG. 1 is to be seen the machine axis 1 and the end stage 11 with a visible moving blade 12. At the outlet-side of the end stage is an annular axial diffusor 13. Following this diffusor, that is to say on the outlet-side, is a deflector 14 terminating in the radial direction. The flow cross-section decreases in the region of the deflector 14; the cross-section $F_3$ is smaller than the cross-section $F_2$. Adjoining the deflector 14, that is to say, on the outlet-side of its end pointing in the radial direction, a radial diffusor 15 is provided. The aperture angle $\alpha_1$ of the axial diffusor 13 is 13° which, compared with the usual values of 6 to 8°, gives a steep diffusor. The radial diffusor 15 has parellel walls, perpendicular to the machine axis. The deflector 14 is bounded by arcuately extending walls, adjoined tangentially by the walls of the axial diffusor and the radial diffusor.

In operation, a considerable proportion of the kinetic energy of the working medium leaving the end stage 11 is converted into pressure energy in the axial diffusor 13 between the flow cross-sections $F_1$ and $F_2$. At the same time, despite the steepness of the diffusor, no flow separation occurs, because the diffusor has been kept short and is followed by the deflector 14, the flow cross-section of which decreases between the flow cross-sections $F_2$ and $F_3$. In the radial diffusor 15, there is again conversion of kinetic energy into pressure energy between the flow cross-sections $F_3$ and $F_4$. At the end of the radial diffusor 15 there is connected a known collecting chamber, not shown, in which the flow no longer requires any special guidance and which may be of any construction.

Due to the steps according to the invention, there is provided an outlet housing of an axial-flow turbomachine, which has a diffusor effect at least equal to the known constructions, and at the same time a considerably shorter overall axial length, the axial length of the entire machine being thereby considerably reduced.

The steeper is the formation of the axial diffusor, the shorter may be its axial length. Investigations have shown that for an appreciable axial shortening of the axial diffusor, its aperture angle should be at least 12°, and that, on the other hand, the aperture angle should not be more than 55° unless necessary. Furthermore, investigations have shown that the flow cross-section in the deflector should decrease preferably by from 5 to 15%. The deflector walls may also consist of one or more circular sectors or of one or more sections extending tangentially to an imaginary arcuate line.

In the compressor outlet housing shown in FIG. 1, the end stage has blade heights of only a few centimeters. The flow cross-sections are, therefore, so small that no auxiliary means in the form of guide blades are necessary for guiding the flow in and after the deflector. In low-pressure steam turbines, on the contrary, blade heights of 70 to 90 cm. occur in the end stage. Here, the requirement for a short overall axial length is particularly pressing, and accordingly the axial diffusor will have to be made particularly steep, so that it will be necessary to provide guide blades.

FIG. 2 shows a portion of an axial section through an outlet housing of a low-pressure steam turbine with guide blades in and after the deflector. At 21 is shown the end stage with a visible moving blade 22, at 23 the axial diffusor, at 24 the deflector and at 25 the radial diffusor. The axial diffusor 23 has an aperture angle $\alpha_2$ of 52°. The walls of the deflector 24 are straight walls, extending tangentially to the imaginary curved lines. Comparison with FIG. 1 shows at once that the axial diffusor 23, in accordance with its larger aperture angle, is much shorter than the axial diffusor 13, despite the greater height of the blade 22 compared with the blades 12.

In the deflector 24 and in the radial diffusor 25 four guide walls 26 are provided, the walls of which extend substantially parallel to the walls of the deflector and parallel to the walls of the radial diffusor. They are secured by means of cylindrical supports 27 to the outer radial diffusor wall in the region of the end of the diffusor, and confine five flow channels 28.

Figure 3:
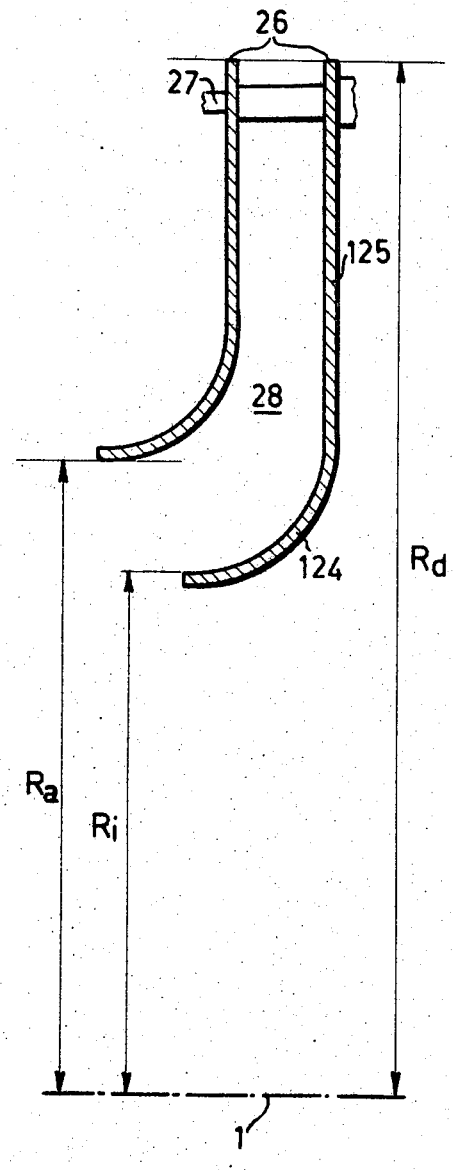
FIGS. 3 and 4 show details of FIG. 2 on a larger scale.

Investigations have shown that, for satisfactory guiding of the flow for each flow channel 28 along the deflector and radial diffusor, it is necessary to satisfy the condition that the ratio of the difference between the radius $R_d$ of the outlet-side end of the radial diffusor part 125 and the internal radius $R_i$ of the inlet-side end of the deflector part 124 to the difference between the external radius $R_a$ and the internal radius $R_i$ of the inlet-side end of the deflector part 124 must be at least 3 and should preferably be at least 4. From FIG. 3, showing the two guide walls 26 situated on the right in FIG. 2 on double the scale, it will be seen that the said ratio $$\frac{R_d - R_i}{R_a - R_i}$$

is 4.5. Since the inclination of the inner wall of the axial diffusor 23 to the machine axis 1 in the embodiment example shown is 3°, and will quite generally always be small, the necessary aperture angle $\alpha_2$ being mainly attained by suitable inclination of the outer wall of the axial diffusor, there is a connection between the hub ratio of the end stage 21 and the number of necessary guide walls 26. For a blade height of 80 cm. of an end stage with a hub ratio of 0.5 to 0.6, there are preferably four guide walls if the dimensional ratios given above are to predominate in the individual flow channels defined by the guide walls.

In FIG. 1, where the blade heights amount to a few centimeters and the flow cross-sections are correspondingly small, the above-mentioned dimensional condition of the flow channel 18, extending over the deflector 14 and radial diffusor 15 and bounded by the walls of these parts, are satisfied and no guide walls are necessary. In FIG. 2, where the blade heights and corresponding flow cross-sections are large, the said conditions for the channel, which extends over the deflector 24 and the radial diffusor 25, and is bounded by the walls of the said parts, and which has no reference numeral, are not satisfied, and to satisfy the said conditions the guide walls 26 must be provided, the flow channels 28, defined by the said guide walls, then satisfying the said conditions.

Figure 4:
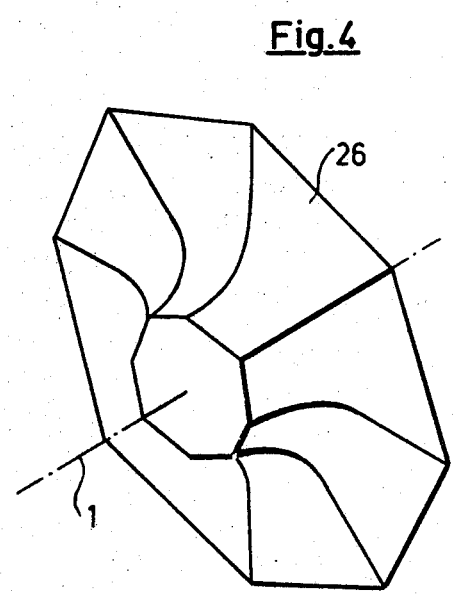

The curved portions of the guide walls 26 represent in principle portions of toroid shells. The production of such parts by metal pressing, however, is difficult and only possible up to a certain limiting diameter and impossible for dimensions occurring in the case of low-pressure steam turbines. The guide walls 26, therefore, have a polygonal form as shown in FIG. 4. Such a guide wall may be welded together from a number of simply curved metal sheets or plates.

What is claimed is:

1. An outlet housing for an axial-flow turbo-machine (1), having an axial diffusor (13, 23) within which the flow cross-section ($F_1$, $F_2$) increases in the direction of flow, having an annular inlet channel adjoining the outlet-side of the end stage (11, 12; 21, 22) of said machine (1), a deflector (14, 24) adjoining the outlet-side of said axial diffusor (13, 23) terminating in radial direction, within which the flow cross-section ($F_2$, $F_3$) decreases in direction of flow, and a radial diffusor (15, 25) adjoining the outlet end of said deflector (14, 24) and having a flow cross-section which increases in the direction of flow.

2. An arrangement defined in claim 1, in which the aperture angle ($\alpha_1$) of said axial diffusor (13) is at least 12°.

3. An arrangement defined in claim 2, in which the aperture angle ($\alpha_2$) of said axial diffusor (23) is 55° at the most.

4. An arrangement defined in claim 1, in which the flow cross-section ($F_2$, $F_3$) within said deflector (14, 24) decreases by from 5% to 15% in direction of flow.

5. An arrangement defined in claim 1, in which in the interior of said deflector (14, 24) and of said radial diffusor (15, 25) at least one flow channel (18, 28) is provided which extends over the whole length of said two parts (14, 24; 15, 25).

6. An arrangement defined in claim 5, in which one sole flow channel (18) is provided, which is confined by the walls of said deflector (14) and said radial diffusor (15).

7. An arrangement defined in claim 8, in which said guide wall (26) within said deflector (24) is formed as a polygonal shell, of which the straight sectors in the peripheral direction are tangential to imaginary toroid shell elements.

8. An arrangement defined in claim 5; and at least one guide wall (26) in the interior of deflector 24 and diffusor 25 and lying substantially parallel with the walls of said deflector and diffusor.

9. An arrangement defined in claim 5 in which in each flow channel (18, 28) the ratio of the difference between the external radius ($R_d$) of the downstream edge of the wall (15, 25, 125) bounding the outlet side of the flow channel and the radius ($R_i$) of this upstream edge of said wall to the difference between the radius ($R_a$) of the inlet edge of the next radially outward wall of the flow channel and the radius $R_i$ is at least three.

10. The combination defined claim 9 in which said ratio is at least 4.

References Cited

UNITED STATES PATENTS

| 2,626,101 | 1/1953 | Curley | 230—133 |
| 3,125,286 | 3/1964 | Sanders | 230—120 |

FOREIGN PATENTS

| 807,066 | 10/1936 | France | 415—209 |
| 991,675 | 6/1951 | France | 415—209 |
| 713,036 | 10/1941 | Germany | 415—209 |
| 107,363 | 1/1898 | Germany | 415—209 |
| 724,553 | 8/1942 | Germany | 415—209 |
| 8,741 | 1906 | Great Britain | 415—209 |
| 384,825 | 12/1932 | Great Britain | 415—127 |

HENRY F. RADUAZO, Primary Examiner

U.S. Cl. X.R.

60—96.5; 415—77